US007034419B2

(12) United States Patent
Kabasawa et al.

(10) Patent No.: US 7,034,419 B2
(45) Date of Patent: Apr. 25, 2006

(54) LEAD FRAME AND DISTRIBUTING PART USING SAME

(75) Inventors: Akira Kabasawa, Saitama (JP); Kazunari Takahashi, Saitama (JP); Akihiro Okamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 101 days.

(21) Appl. No.: 10/651,029

(22) Filed: Aug. 29, 2003

(65) Prior Publication Data

US 2004/0070293 A1  Apr. 15, 2004

(30) Foreign Application Priority Data

Aug. 29, 2002  (JP) ............................ P.2002-251952

(51) Int. Cl.
*H02K 3/50* (2006.01)
*H02K 11/00* (2006.01)

(52) U.S. Cl. .......................... 310/71; 310/260
(58) Field of Classification Search ................ 310/71, 310/260, 179
See application file for complete search history.

(56) References Cited

U.S. PATENT DOCUMENTS 5,828,147 A * 10/1998 Best et al. .................... 310/71
5,900,687 A * 5/1999 Kondo et al. ................ 310/71
6,600,244 B1 * 7/2003 Okazaki et al. .............. 310/71

FOREIGN PATENT DOCUMENTS

| JP | 61-53945 A | 11/1986 |
| JP | 10-248187 A | 9/1998 |
| JP | 11-299159 A | 10/1999 |
| JP | 2001-025198 | 1/2001 |
| JP | 2001-69710 | * 3/2001 |

* cited by examiner

*Primary Examiner*—Darren Schuberg
*Assistant Examiner*—Leda Pham
(74) *Attorney, Agent, or Firm*—Arent Fox PLLC

(57) ABSTRACT

An electric motor lead frame for connecting motor coils of the same phase is formed integrally by a linear conductor. The linear conductor includes at least a single conducting wire and has terminal portions formed by bending for connection with winding ends of motor coils.

12 Claims, 14 Drawing Sheets

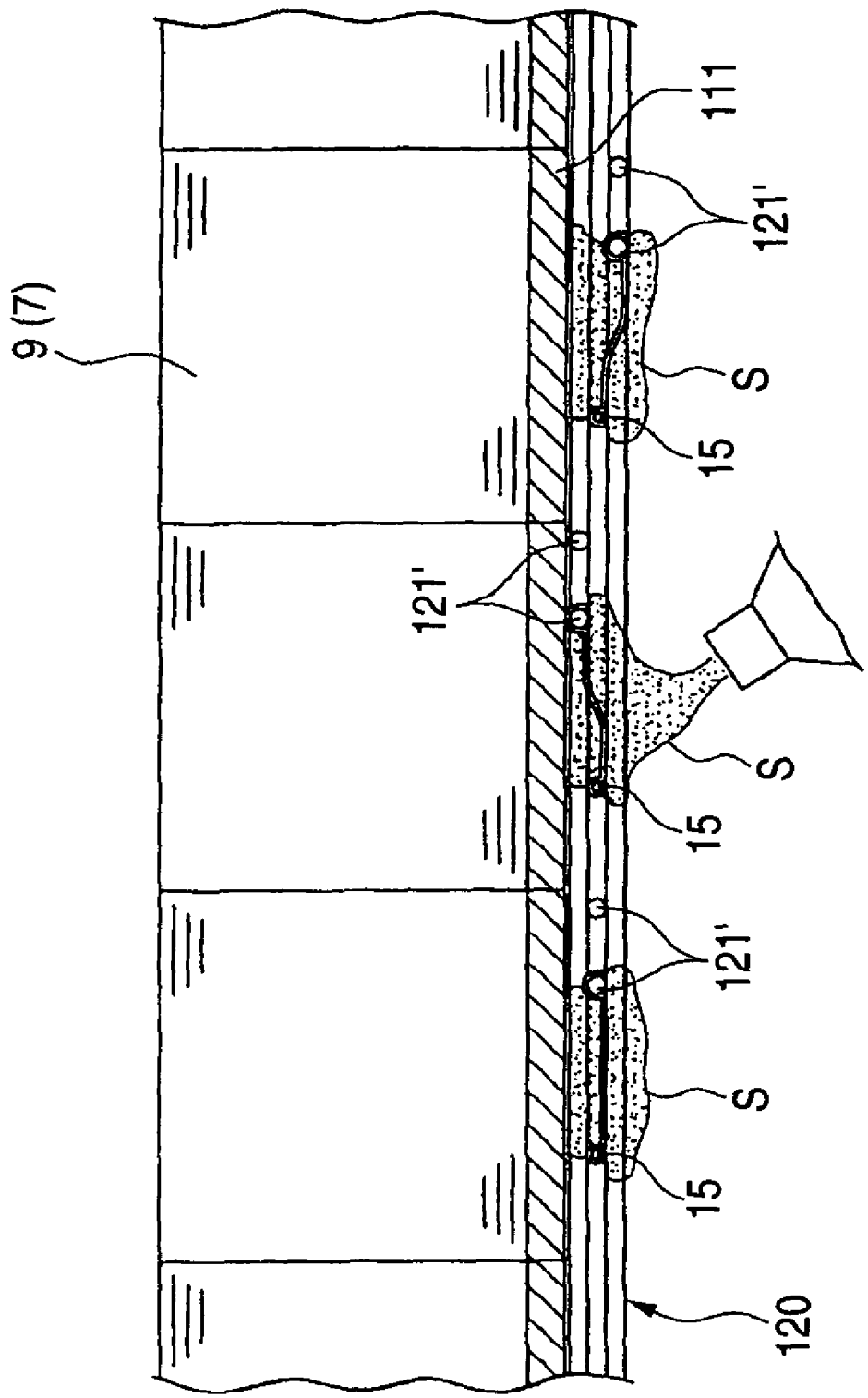

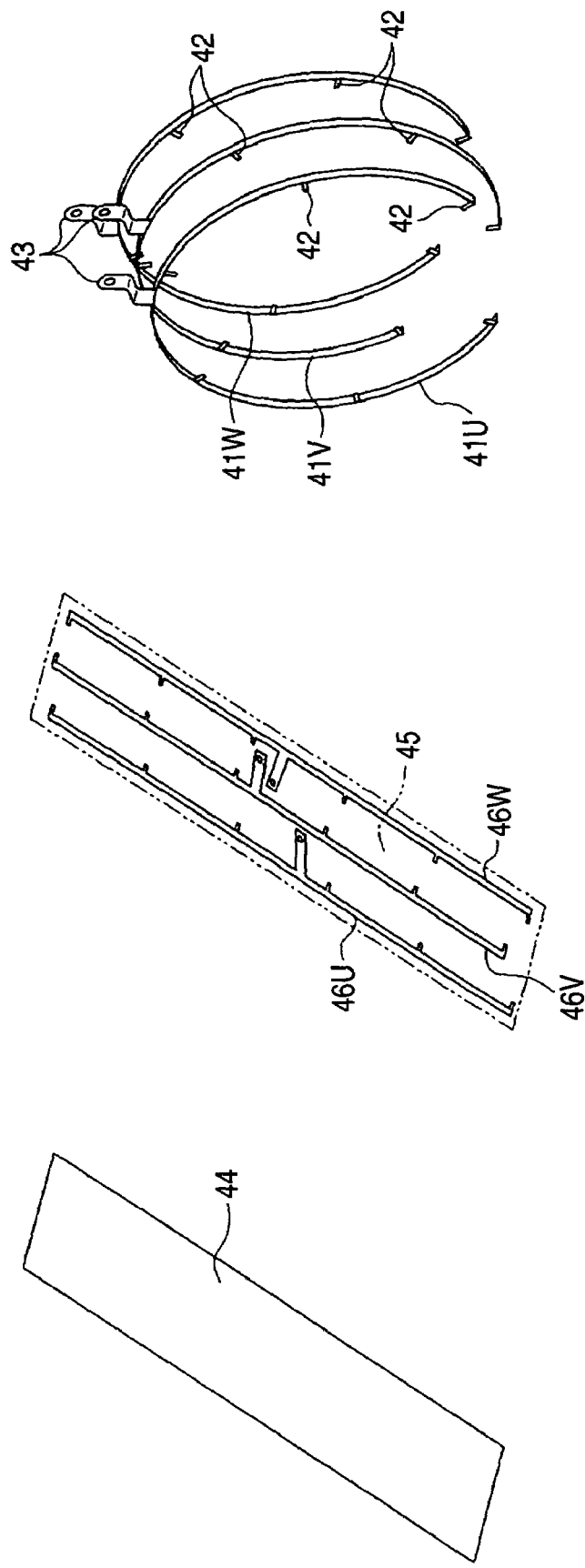

LEAD FRAME AND DISTRIBUTING PART USING SAME

BACKGROUND OF THE INVENTION

1. Field of the Invention

The present invention relates to a lead frame for use in connecting motor coils of an electric motor used on, for example, a hybrid vehicle and a distributing part using the same lead frame.

2. Description of the Related Art

In the related art, a distributing part for use in connecting motor coils is fabricated, for example, in a process described below.

Firstly, as shown in FIG. 16A, a copper plate 44 which is cut to a desired size is prepared, and by applying a press blanking process to this copper plate 44, frame parts 46U, 46V, 46W shown in FIG. 16B are formed. Next, by applying a bending process to these frame parts 46U, 46V, 46W, lead frames 41U, 41V, 41W shown in FIG. 16C are formed. Then, these lead frames 41U, 41V, 41W are set in a mold in a state in which the lead frames are stacked on each other in such a manner as to provide a gap therebetween, and by molding a molding resin (an engineering plastic) through injection molding, the respective lead frames are integrated together in an insulated state to thereby fabricate a distributing part. A similar construction to this is shown in, for example, JP-A-2001-25198.

The motor coils (not shown) are connected to terminal portions 42 formed on the respective lead frames 41 via connecting parts by virtue of fusing (sport welding) or soldering. In addition, polyphenylene sulfide (PPS) or liquid crystal polymer (LCP) is used for the molding resin. In the illustrated example, six terminal portions 42 are provided for U, V and W phases, respectively. Note that reference numeral 43 denotes feeding terminal portions for feeding current the respective lead frames for the U, V and W phases.

Incidentally, in a large motor in which the diameter of a stator, for example, becomes 150 mm or greater, the distributing part used in this motor becomes large and current to be conducted is increased. Therefore, in the event that the motor is operated, the temperature of the respective lead frames 41U, 41V, 41W increases, and this leads to an increase in temperature of the molding resin. Since the molding resin is molded under a high injection pressure, the resin so molded adheres to the lead frames to thereby provide an integral construction. Thus, in the event that the distributing part deforms due to heat, there is caused a problem that a large strain is generated between the copper lead frames and the molding resin due to a difference in coefficient of thermal expansion therebetween.

In addition, as shown in FIG. 16B, in a case where the lead frames 41U, 41V, 41W are formed by press blanking or cutting the copper plate 44, a waste part 45 of the copper plate becomes large. Hence, the loss of the material becomes large, there is caused a problem that the yield is deteriorated and the production costs are increased. In particular, when the distributing part becomes large, the size and thickness of the copper plate 44 are increased, and this remarkably increases the loss of the material.

SUMMARY OF THE INVENTION

The invention was made in these situations, and an object thereof is to provide a lead frame which can reduce the loss of material at the time of production and the generation of strain due to thermal expansion and a distributing part using the lead frame.

With a view to attaining the object, according to a first aspect of the invention, there is provided an a lead frame (for example, lead frames 140U, 140V, 140W in an embodiment) for connecting motor coils (for example, motor coils 8 in the embodiment) of the same phase of an electric motor, the lead frame comprising:

a linear conductor (for example, a single wire conductor 28b in the embodiment) including at least a single conducting wire, and having terminal portions (for example, terminal portions 121 in the embodiment) formed by bending for connection with winding ends of the motor coils, wherein the lead frame is integrally formed by the linear conductor.

According to this construction, a ring-like lead frame can be formed integrally by bending the linear conductor.

According to a second aspect of the invention, there is provided a lead frame as set forth in the first aspect of the invention, wherein the linear conductor is covered with an insulating material (for example, an insulating material 28a in the embodiment). Preferably, the terminal portions are exposed from the insulating material.

According to this construction, the linear conductor is exposed only at the terminal portions of the lead frame by removing the coating thereat and the remaining portion of the lead frame can remain covered with the insulating material.

According to a third aspect of the invention, there is provided a lead frame as set forth in the first or second aspect of the invention, wherein the lead frame is formed annularly along a direction in which the motor coils are arranged, and wherein the terminal portions are formed into a U-shape in such a manner as to protrude radially inwardly and are provided to correspond to the motor coils, respectively.

According to this construction, the winding ends of the motor coils and the terminal portions of the lead frame can correspond to each other for connection. In addition, when sealing the connecting portions between the winding ends of the motor coils and the terminal portions by filling a sealing material thereat, side portions of the U-shape can constitute a flow stopper or stop the flow of the sealing material.

According to a fourth aspect of the invention, there is provided a lead frame (for example, lead frames 40U, 40V, 40W in another embodiment) for connecting motor coils of the same phase of an electric motor, the lead frame comprising:

a plurality of frame parts (for example, frame parts 28 in the embodiment), each including a linear conductor and having bent portions (for example, bent portions 29 in the embodiment) at end portions thereof, wherein the adjacent bent portions of the frame parts are connected to each other to form single body in such a manner that a winding end of the motor coil can be held therebetween.

The linear conductor may be covered with an insulating material. The bent portions may be exposed from the insulating material.

According to this construction, the lead frame can be formed by bending the linear conductor. In addition, the linear conductor is exposed only at the terminal portions of the lead frame by removing the coating thereat and the remaining portion of the lead frame can remain covered with the insulating material. Furthermore, the winding end of the motor coil can be held between the bent portions of the frame parts to thereby be fixed temporarily.

According to a fifth aspect of the invention, there is provided a lead frame as set forth in the fourth aspect of the invention, wherein the lead frame is formed annularly along a direction in which the motor coils are arranged, and wherein the bend portions extend radially inwardly and are provided to correspond in position to the motor coils, respectively.

According to this construction, the winding ends of the motor coils and the terminal portions of the lead frame can correspond to each other for connection.

According to a sixth aspect of the invention, there is provided a lead frame as set forth in the fourth aspect of the invention, wherein the adjacent bent portions of the frame parts are connected to each other through soldering.

According to this construction, the connection of the respective frame parts and the connection of the bent portions of the frame parts and the wiring ends of the motor coils can be implemented at the same time through soldering.

According to a seventh aspect of the invention, there is provided a lead frame as set forth in the fourth aspect of the invention, wherein the adjacent bent portions of the frame parts are connected to each other through fusion welding.

According to this construction, the connection of the respective frame parts and the connection of the bent portions of the frame parts and the wiring ends of the motor coils can be implemented at the same time through fusion welding.

According to an eighth aspect of the invention, there is provided a distributing part of an electric motor, the distributing part comprising:

the lead frames as set forth in any of the first to sixth aspects of the invention provided for at least a U-phase, a V-phase, and a W-phase, respectively, the plurality of lead frames being fixed together with a fixing member (for example, fixing parts 26, 27, molding resins 23, 123 in a further embodiment) partially so as to be integrated into a single body.

According to this construction, the lead frames corresponding to the plurality of phases can be handled together. In addition, the respective lead frames are fixed partially, so that they are allowed to extend and contract accordingly.

According to a ninth aspect of the invention, there is provided a distributing part of an electric motor as set forth in the eighth aspect of the invention, wherein the adjacent bent portions of the frame parts of the responsive lead frames may be connected to each other in a similar process to that in which the winding end of the motor coil is connected to the bent portion.

According to this construction, the winding ends of the motor coils and the bent portions of the frame parts can be made to correspond to each other for connection, and the connection of the respective frame parts and the connection of the bent portions of the frame parts and the winding ends of the motor coils can be implemented at the same time. In addition, the bent portions of the lead frame and the winding ends of the motor coils can be directly connected to each other.

BRIEF DESCRIPTION OF THE DRAWINGS

FIG. 15 is an explanatory cross-sectional view taken along the line XV—XV in FIG. 14A;

FIG. 16A is a perspective view of a material before processes of fabricating lead frames are started;

FIG. 16B is a perspective view of the material during the processes of fabricating lead frames; and FIG. 16C is a perspective view of the material after the processes of fabricating lead frames have been completed.

DETAILED DESCRIPTION OF THE INVENTION

Hereinafter, a first embodiment of the invention will be described based on FIGS. 1 to 10.

Figure 1:
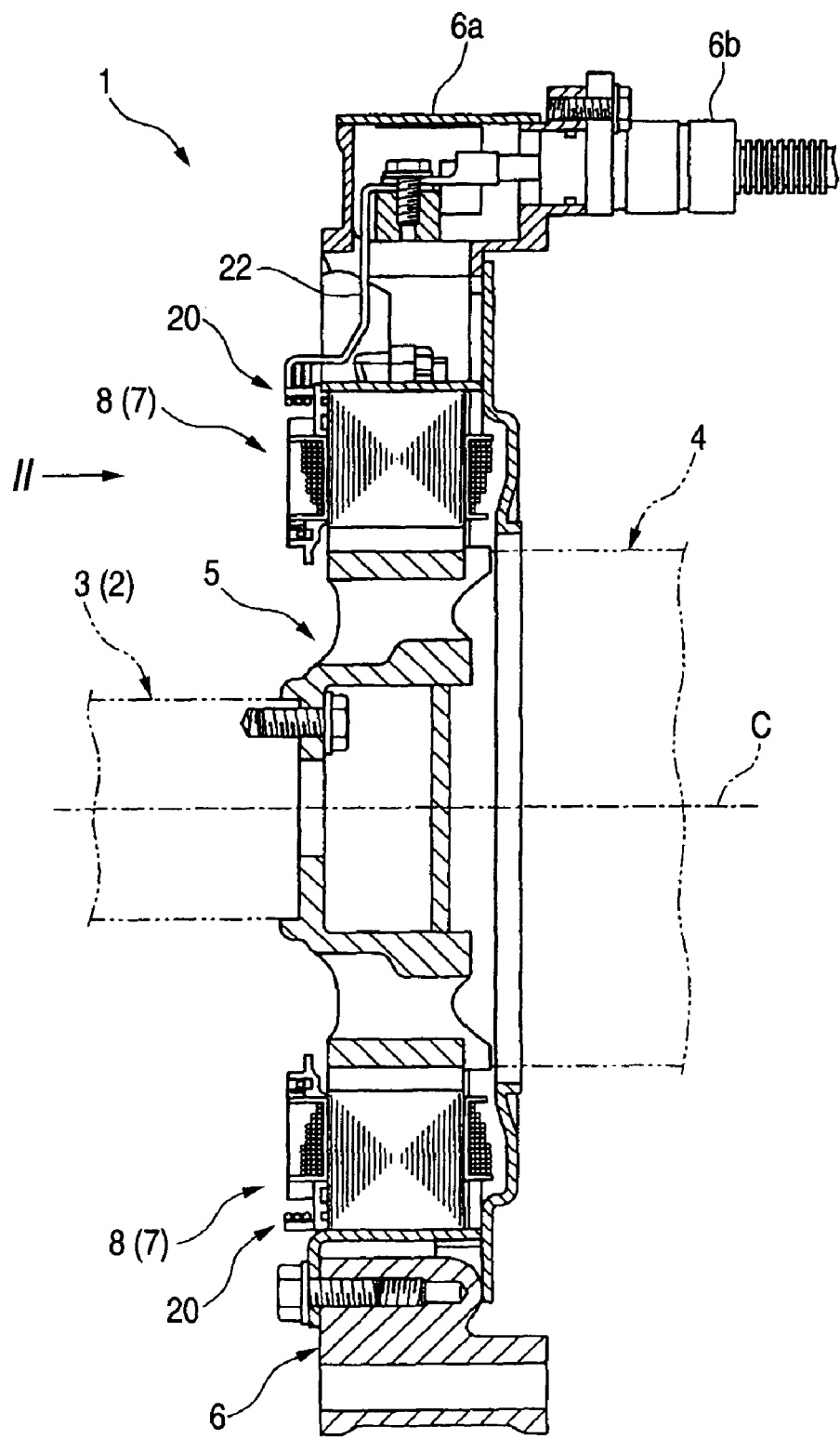
FIG. 1 is an explanatory side view of a motor according to first and second embodiments of the invention.

A motor (an electric motor) 1 shown in FIG. 1 is such as to be used on a hybrid vehicle and is disposed in such a manner as to share an axis C with a crankshaft 3 of an internal combustion engine 2 and a transmission 4. A rotor 5 of the motor 1 is connected to the crankshaft 3 of the engine 2 and the transmission 4 and is designed to rotate relative to a stator 7 fixed to the engine 2 via housing 6. Then, the motor 1 is designed not only to assist in driving the engine 2 when supplied with power but also to regenerate power from part of kinetic energy during braking.

Here, the motor 1 is constructed as a three-phase alternating current motor, and a plurality of motor coils 8 provided on the stator 7 are connected by a distributing part 20 so as to correspond to a U phase, a V phase and a W phase. Feeding terminal portions 22 which correspond to the respective phases are provided on this distributing part 20, and these feeding terminal portions 22 are led to a terminal holder 6a provided at an upper portion of the housing 6 so as to be connected to terminals 6b of the respective phases.

Figure 2:
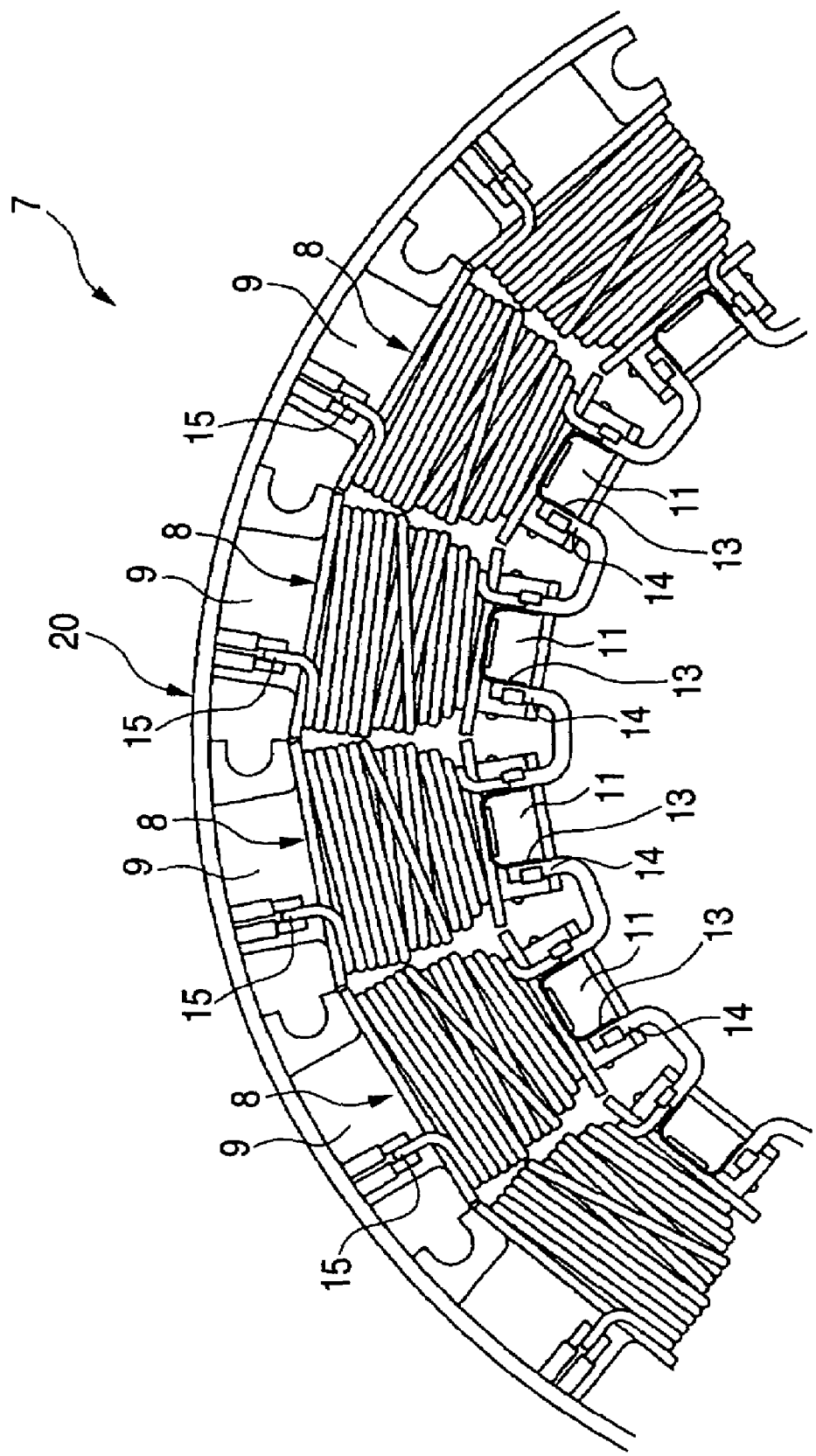
FIG. 2 is a view as seen in a direction indicated by an arrow II in FIG. 1.

As shown in FIG. 2, the stator 7 is provided with a plurality of stator core portions 9 which are arranged along a circumferential direction. The stator core portion 9 is formed to protrude radially inwardly to provide a protruding portion, and a conducting wire is wound around the protruding portions via an insulator 11 having insulation properties, whereby there are provided the plurality of motor coils 8 which are arranged in the circumferential direction.

A conductive connecting part 13 having two clamping portions is attached to the insulator 11 at a location on an inner circumferential side of each motor coil 8. The conducting wire of the motor coil 8 is fixed by one of the clamping portions of the connecting part 13, and a conducting wire end 14 of the adjacent motor coil 8 is fixed by the other clamping portion. Therefore, conducting wire ends 14 on the inner circumferential side of the motor coils 8 are connected to each other along the full circumference of the stator 7, and by connecting part of the conducting wire ends 14 so connected to an earth terminal, not shown, a middle point connection of the motor coils 8 is implemented.

In addition, a distributing part 20 is provided at locations on outer circumferential sides of the motor coils 8 in such a manner as to extend along an outer circumference of the stator 7. Conducting wire ends 15 on the outer circumferential sides of the motor coils 8 are connected together for each phase by this distributing part 20, whereby exciting current in the U phase, V phase and W phase is supplied to the corresponding motor coils 8 from the terminals 6b.

Figure 3:
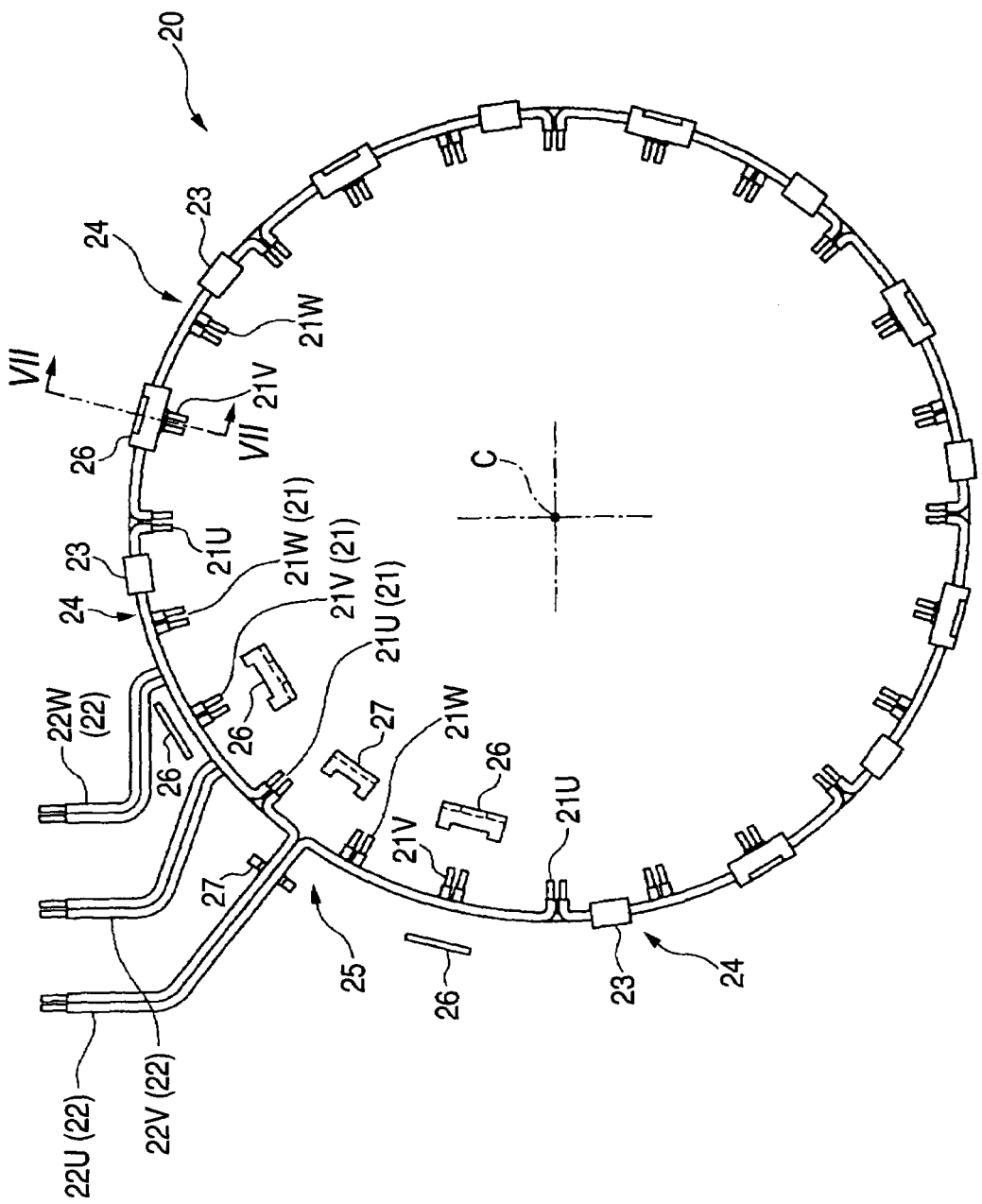
FIG. 3 is a front view showing the first embodiment of the invention.

As shown in FIG. 3, the distributing part 20 is formed into an annular shape and has a plurality (24 locations in this embodiment) of terminal portions 21 which protrude radially inwardly and feeding terminal portions 22 in three phases which are formed in such a manner as to extend radially outwardly.

The terminal portions 21 are assigned to terminal portions 21U which correspond to the U phase, terminal portions 21V which correspond to the V phase and terminal portions 21W which correspond to the W phase, respectively. These terminal portions 21 are disposed at equal intervals in the circumferential direction while being continuously arranged in a clockwise direction as viewed in FIG. 3 in the order of U, V and W phases. In addition, the feeding terminal portions 22 are assigned to a feeding terminal portion 22U which corresponds to the U phase, a feeding terminal portion 22V which corresponds to the V phase and a feeding terminal portion 22W which corresponds to the W phase and are formed so as to be led to the terminal holder 6a along predetermined paths, respectively.

Then, the distributing part 20 is constructed so as to be divided into a total of eight components of a similar figure, i.e., a plurality (seven in this embodiment) of assembly parts 24 which are each made to partially get together with molding resin (fixing member) 23 and a feeding parts assembly 25 to which the feeding terminal portions 22 are connected, and these components are partially connected together with fixing parts (fixing member) 26, 27 so as to be integrated into a single body.

Figure 4:
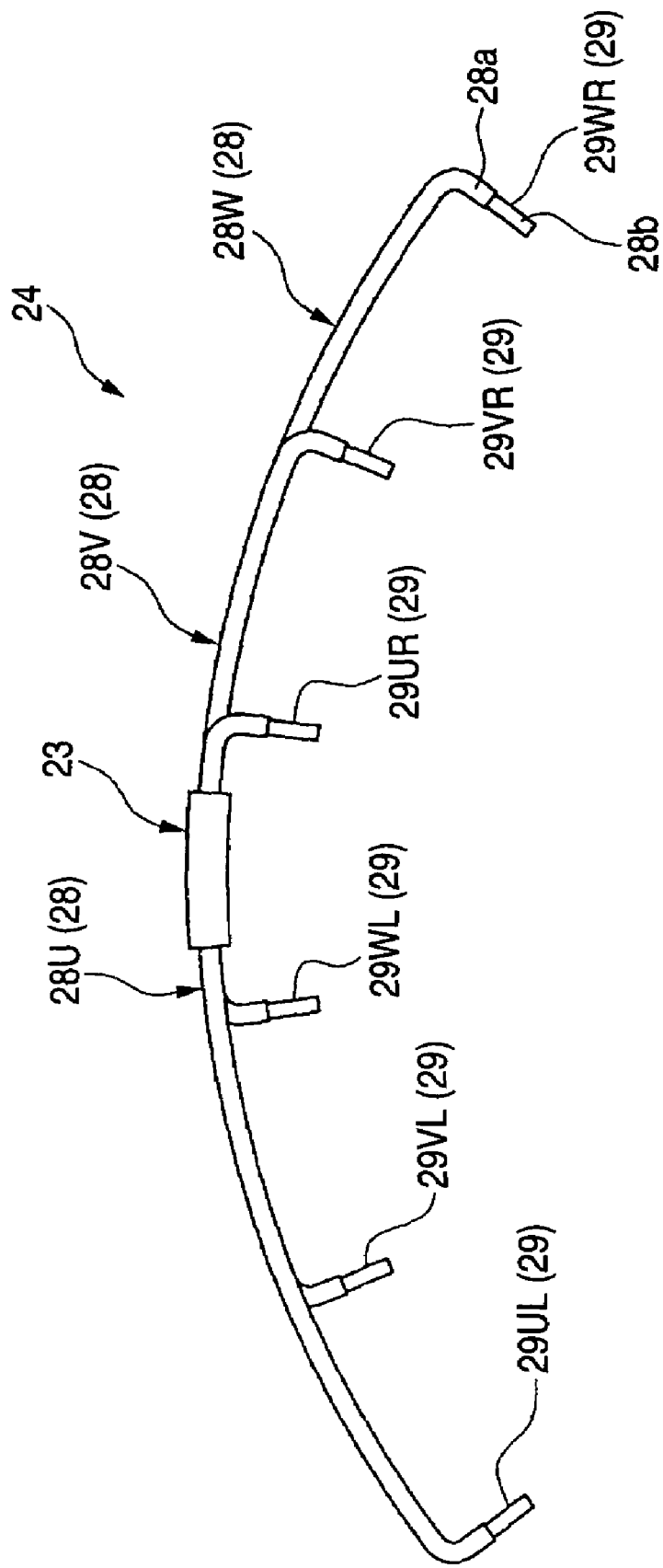
FIG. 4 is a front view of an assembly part.
Figure 5:
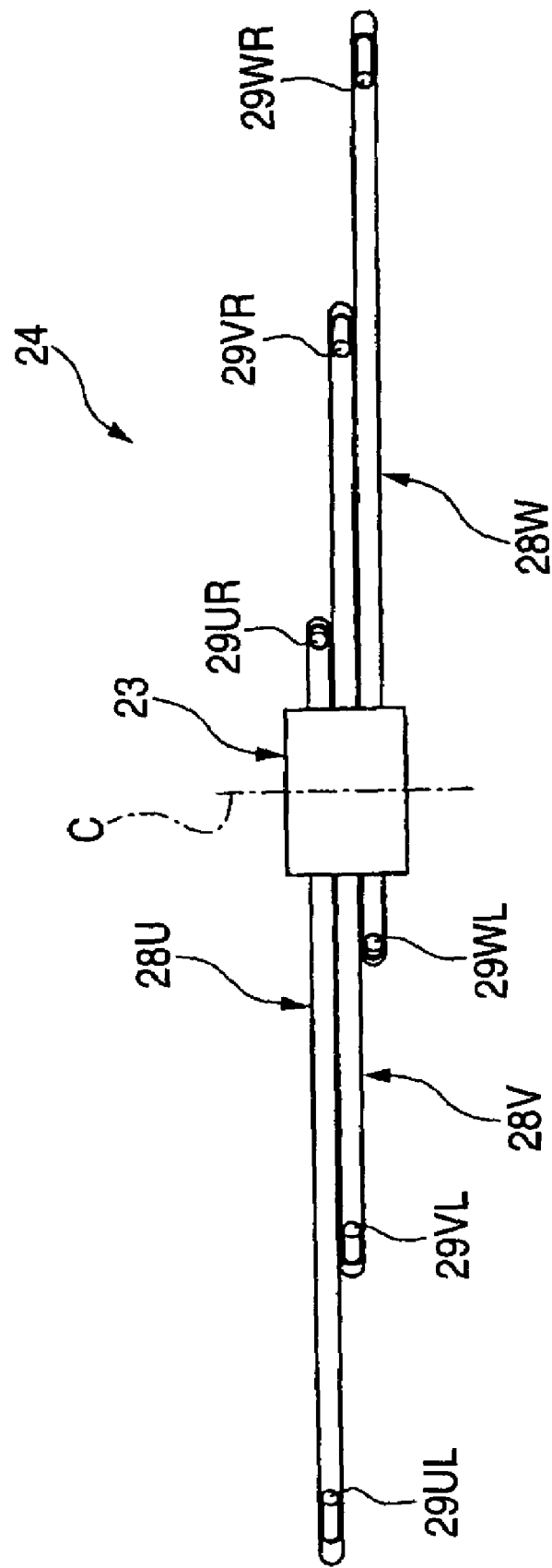
FIG. 5 is a bottom view of FIG. 4.

As shown in FIGS. 4, 5, the assembly part 24 has three frame parts 28 which are each formed into an arc-like shape, and the three frame parts 28 are arranged to get together along the axis C and are partially connected together with the molding resin 23. Each frame part 28 is made up of an insulated electric wire constituted by a solid wire conductor (linear conductor) 28b which is covered with an insulating material 28a and is formed so as to follow the configuration of the distributing part 20. Both ends of the frame part 28 are bent to extend radially inwardly so as to form a pair of bent portions 29. Here, the insulated electric wire is desirably a copper wire having a diameter of 1 to 5 mm which is coated with an insulating film.

A stripping process is applied to each bent portion 29 so as strip off the insulating material 28a thereat, and the solid wire conductor 28b is exposed at a distal end thereof. As viewed in FIG. 5, the respective frame parts 28 of the assembly part 24 are assigned from the top to a frame part 28U which corresponds to the U phase, a frame part 28V which corresponds to the V phase and a frame part 28W which corresponds to the W phase. The three frame parts are made to get together side by side in such a manner that the position of the frame part 28V is shifted rightward in the circumferential direction relative to the frame part 28U, and the position of the frame part 28W is shifted rightward in the circumferential direction relative to the frame part 28V.

In addition, assuming that the bent portions 29 of the respective frame parts 28 are denoted from the left in FIG. 4 as a bent portion 29Ul, a bent portion 29VL and a bent portion 29WL, a bent portion 29UR, a bent portion 29VR, and 29WR, the three frame parts 28 get together side by side only between the bent portions 29WL and 29UR, and by providing the molding resin 23 at this portion, the respective frame parts 28 are fixed integrally.

Then, when the plurality of assembly parts 24 are disposed such that the frame parts 28 which correspond to the respective phases are arranged in a ring-like fashion, the bent portion 29UL and the bent portion 29UR, the bent portion 29VL and the bent portion 29VR, or the bent portion 29WL and the bent portion 29WR of the adjacent assembly parts 24 are arranged in parallel with each other with a gap being provided therebetween which corresponds to the diameter of the conducting wire of the motor coil 8. These adjacent bend portions form the terminal portions 21U, 21V, 21W corresponding to the respective phases of the distributing part 20 (refer to FIG. 3).

Figure 6:
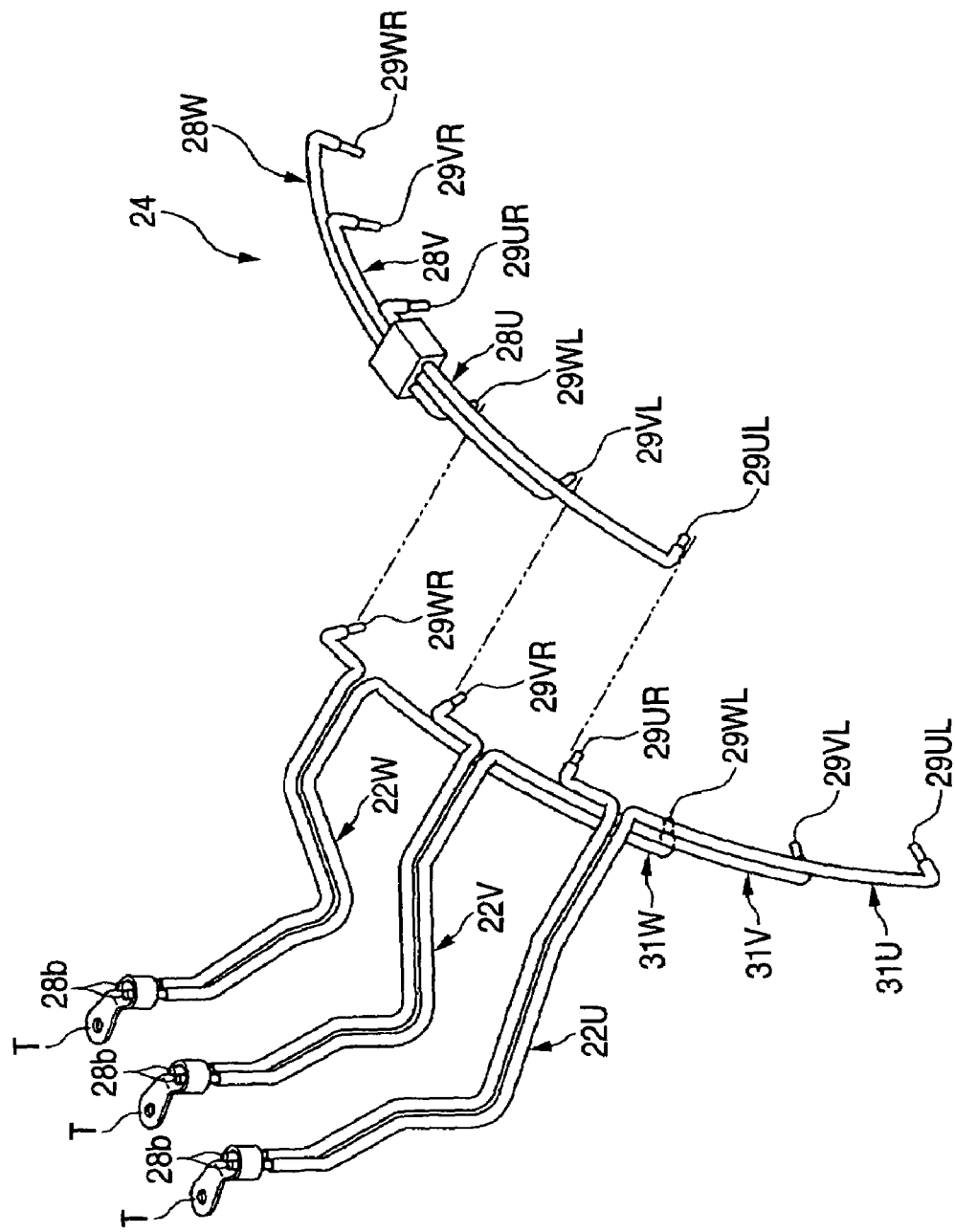
FIG. 6 is perspective views of a feeding parts assembly and an assembly part.

As shown in FIG. 6, for the assembly parts 24, the feeding parts assembly 25 of the distributing part 20 is constructed so as to be provided with the feeding terminal portions 22U, 22V, 22W which correspond to the respective phases. To be specific, for the frame parts 28U, a feeding part 31U has the feeding terminal portion 22U which is made up of two solid wire conductors which are divided at an intermediate portion between a bent portion 29WL and a bent portion 29UR and which extend radially outwardly at distal ends thereof. Similarly, a feeding part 31V is provided with the feeding terminal portion 22V which corresponds to the frame parts 28W, and a feeding part 31W is provided with the feeding terminal portion 31W which corresponds to the frame parts 28W. The feeding parts 31U, 31V, 31W are formed into similar shapes.

Then, the feeding parts assembly 25 is made up of these feeding parts 31U, 31V, 31W. Note that the insulating material 28a is stripped off at the distal ends of the respective feeding terminal portions 22U, 22V, 22W, and a terminal T is attached to the exposed sold wire conductor 28b. In addition, no molding resin 23 is provided on the feeding parts assembly 25.

Figure 7:
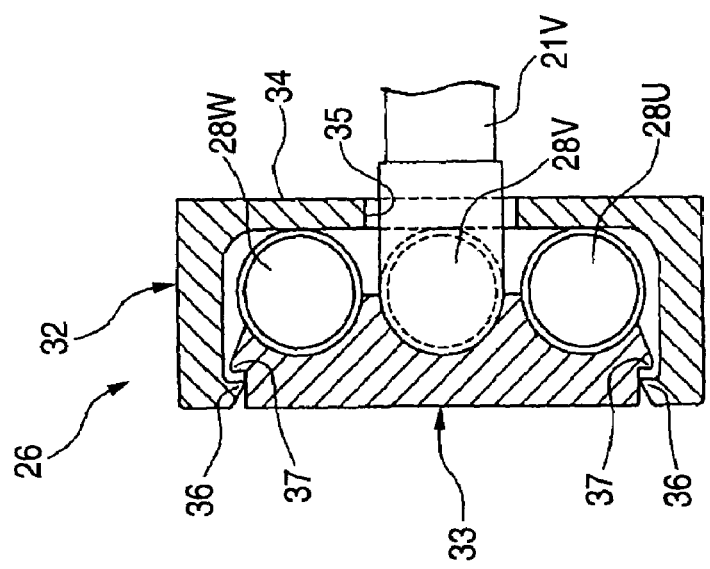
FIG. 7 is a cross-sectional view taken along the line VII—VII in FIG. 3.

As shown in FIG. 7, the fixing part 26 includes a main body portion 32 having a U-shaped cross section which is formed so as to cover the frame parts 28U, 28V, 28W of the respective phases and a lid portion 33 which is formed so as to close the U-shaped cross section of the main body portion 32. A pass-through hole 35 corresponding to the terminal portion 21V of the V phase is formed in a bottom wall 34 of the main body portion 32, and the main body portion 32 is adapted for attachment to the frame parts 28 with the terminal portion 21V being allowed to pass through the pass-through hole 35. A side of the lid portion 33 which faces the main body portion 32 is formed so as to match external configurations of the frame parts 28U, 28V, 28W of the respective phases. With the frame parts 28U, 28V, 28W of the respective phases being held between the lid portion 33 and the main body portion 32, claw portions 37 on the lid portion 33 are brought into locking engagement with locking portions 36 provided on the main body portion 32, so that the respective assembly parts 24 can be connected to the feeding parts assembly 25.

Figure 8:
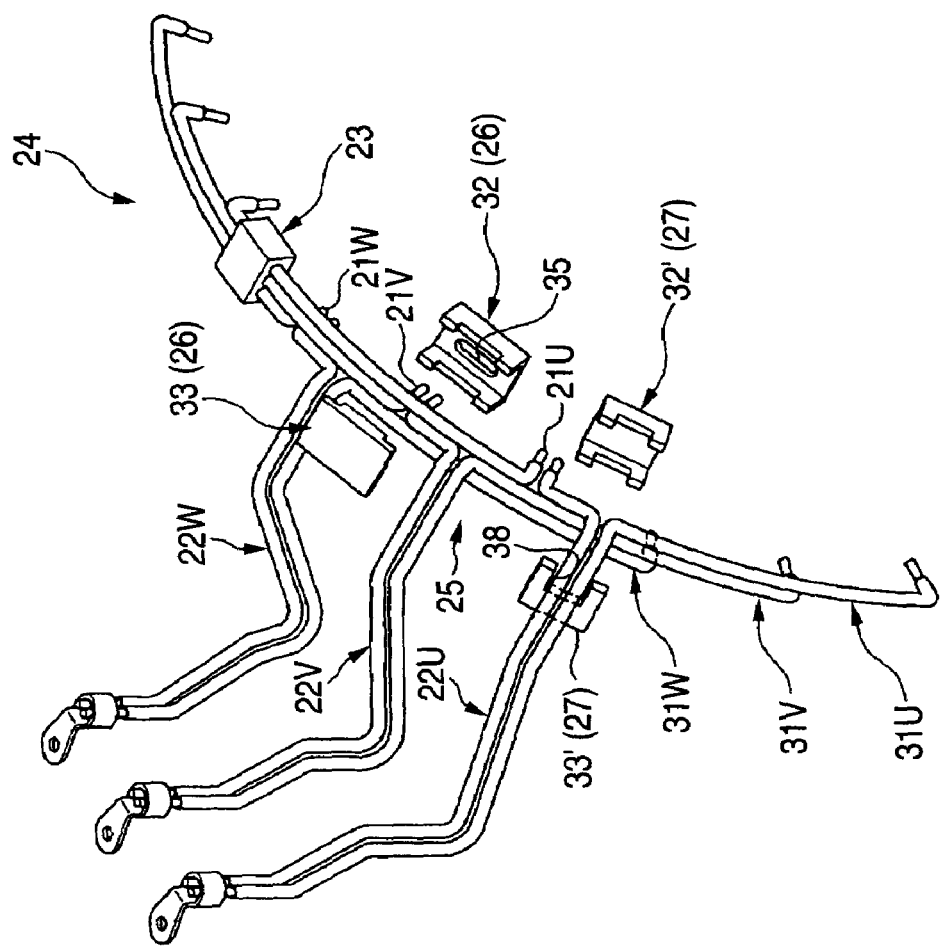
FIG. 8 is an exploded perspective view of a fixing part.

In addition, as shown in FIG. 8, the fixing part 27 is attached to a location where the U-phase feeding terminal portion 22U is provided. This fixing part 27 is made up of a main body portion 32' which, in contrast to the main portion 33, has no such pass-through hole 35 and a lid portion 33' which, in contrast to the lid portion 33, has a notch 38 provided to avoid the feeding terminal portion 22U.

Then, the assembly parts 24 and the feeding parts assembly 25 are arranged in the ring-like fashion and are then partially connected together with the fixing parts 26, 27, whereby the distributing part 20 is fixed integrally.

Figure 9:
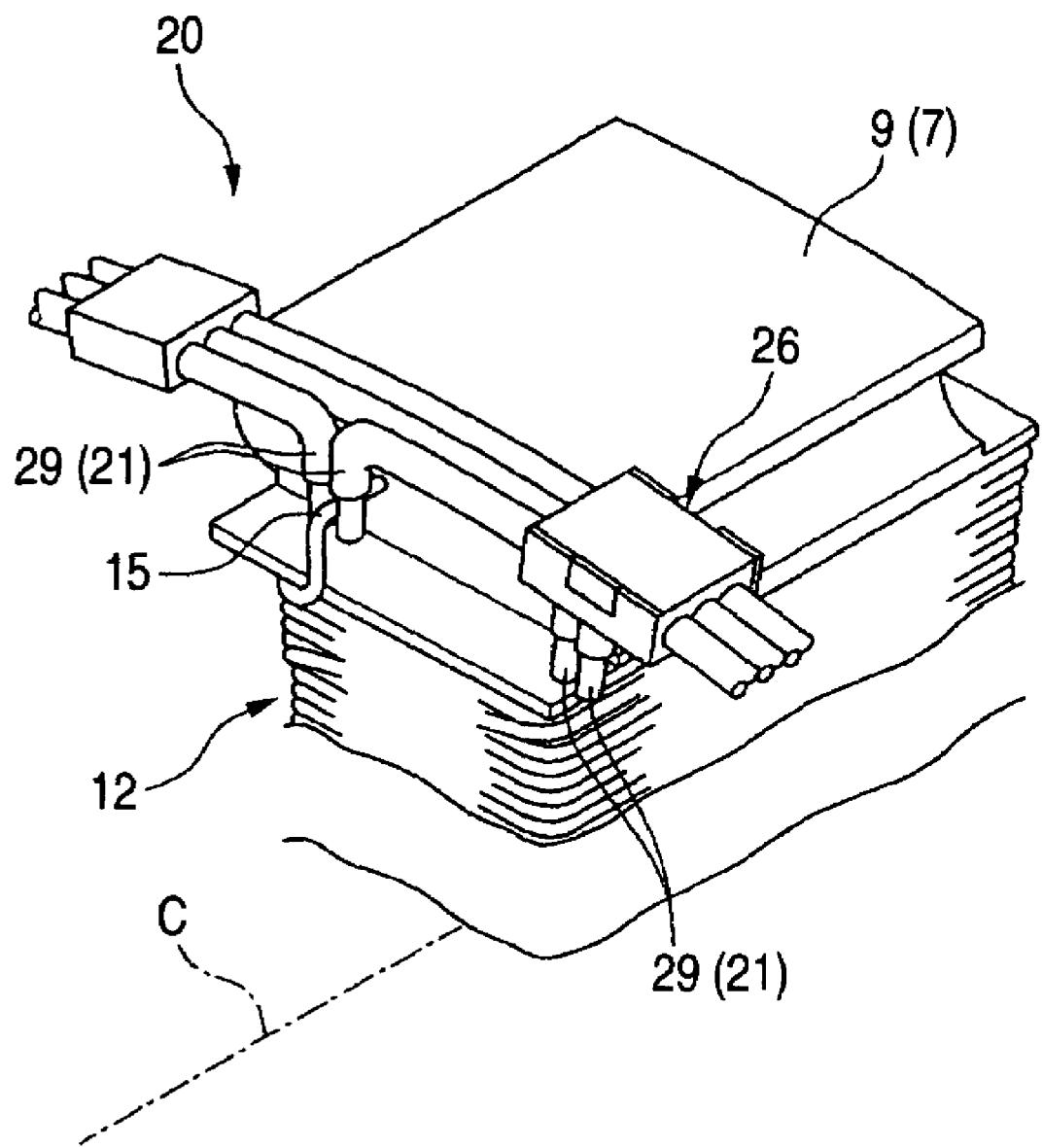
FIG. 9 is a perspective view of a connecting portion between a conducting wire end of a motor coil and a terminal portion.
Figure 10:
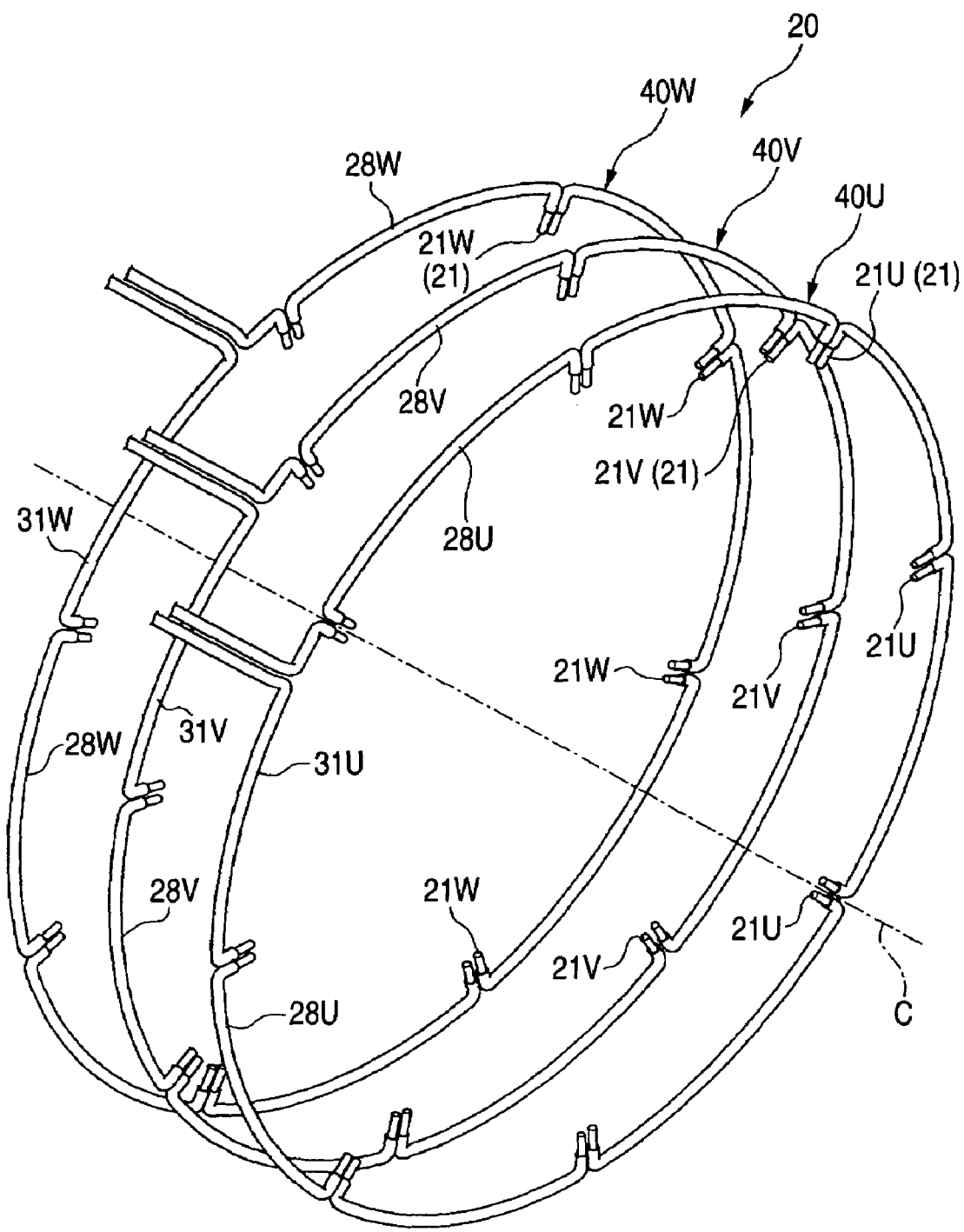
FIG. 10 is an exploded perspective view of respective lead frames.

The distributing part 20 which is formed into the ring-like shape as has been described heretofore is attached to the stator 7 and the terminal portions 21 corresponding to the respective phases and the conducting wire ends 15 of the motor coils 8 are directly connected together through soldering, whereby the connection of the terminal portions 21 with the conducting wire ends 15 of the motor coils 8 are completed for each phases. As this occurs, since the gap corresponding to the diameter of the conducting wire of the coil 8 is provided between the bent portions 29 forming the terminal portions 21 corresponding to the respective phases, as shown in FIG. 9, the conducting wire end 15 which is bent to extend along the axis C can be held in this gap for temporary fixation. Since soldering can be implemented in this state, the connection of the motor coil 8 to the distributing part 20 can be implemented, and the connection of the frame parts 28 having the same phase of the distributing part 20 can be implemented simultaneously. In addition, since the terminal portions 21 and the conducting wire ends 15 of the motor coils 8 are directly connected to each other, there needs no such connecting part as the connecting part 13 which is used in the middle point connection occurring on the inner circumferential side of the motor coil 8.

Then, when the frame parts 28 of the same phase are connected together, ring-like integrated lead frames 40U, 40V, 40W are formed for the U, V and W phases, respectively. Namely, the lead frame 40U is made up of the plurality of frame parts 28U which have the similar shapes and the feeding part 31U. Similarly, the lead frame 40V is made up of the frame parts 28V and the feeding part 31V, and the lead frame 40W is made up of the frame parts 28W and the feeding part 31W. In addition, the lead frames 40U, 40V, 40W of the respective phases have the terminal portions 21U, 21V, 21W of the corresponding phases, respectively, and are each formed of the solid wire conductor 28b which is covered with the insulating material 28a except for the respective terminal portions 21.

These lead frames 40U, 40V, 40W of the respective phases are made to get together side by side in the direction of the axis C and are then partially fixed together to thereby form the distributing part 20. Here, the respective terminal portions 21 from which the insulating material is stripped off are disposed at predetermined intervals in the circumferential direction, and the remaining portions except for the terminal portions 21 are covered with the insulating material, whereby the lead frames 40U, 40V, 40W of the respective phases are electrically insulated from each other.

According to the first embodiment that has been described heretofore, since the ring-like lead frames 40U, 40V, 40W can be formed by connecting the plurality of frame parts 28 which are each formed by bending the solid wire conductor, less waste material is produced when compared with, for example, a case where lead frames are formed by pressing, thereby making it possible to increase remarkably the yield of material.

In addition, since the distributing part 20 is made up of the insulated electric wires each comprising the solid wire conductor to which the insulation coating is applied, the insulating material is stripped off only from the terminal portions 21 by applying the stripping process thereto, whereas the remaining portions can be made to remain in the covered state with the insulating material. With the lead frames 40U, 40V, 40W of the respective phases being insulated from each other, the respective lead frames 40U, 40V, 40W may be integrated with each other so as to attain an efficient connecting operation with the motor coils 8, and therefore, the molding resin 23 and the fixing parts 26, 27 may be used only at the certain locations. Consequently, no molding process has to be applied to the entirety of the distributing part 20 with a view to electrically isolating the respective lead frames 40U, 40V, 40W and integrating them with each other. In the event that the lead frames 40U, 40V, 40W are caused to extend and/or contract due to a severe energizing cycle, a deformation of the distributing part 20 that would be so generated can be permitted.

Next, a second embodiment of the invention will be described based on FIGS. 11 to 15 while continuing to refer to FIGS. 1, 2. Note that like reference numerals are imparted to like portions to those described in the first embodiment, and the description thereof will be omitted.

Figure 11:
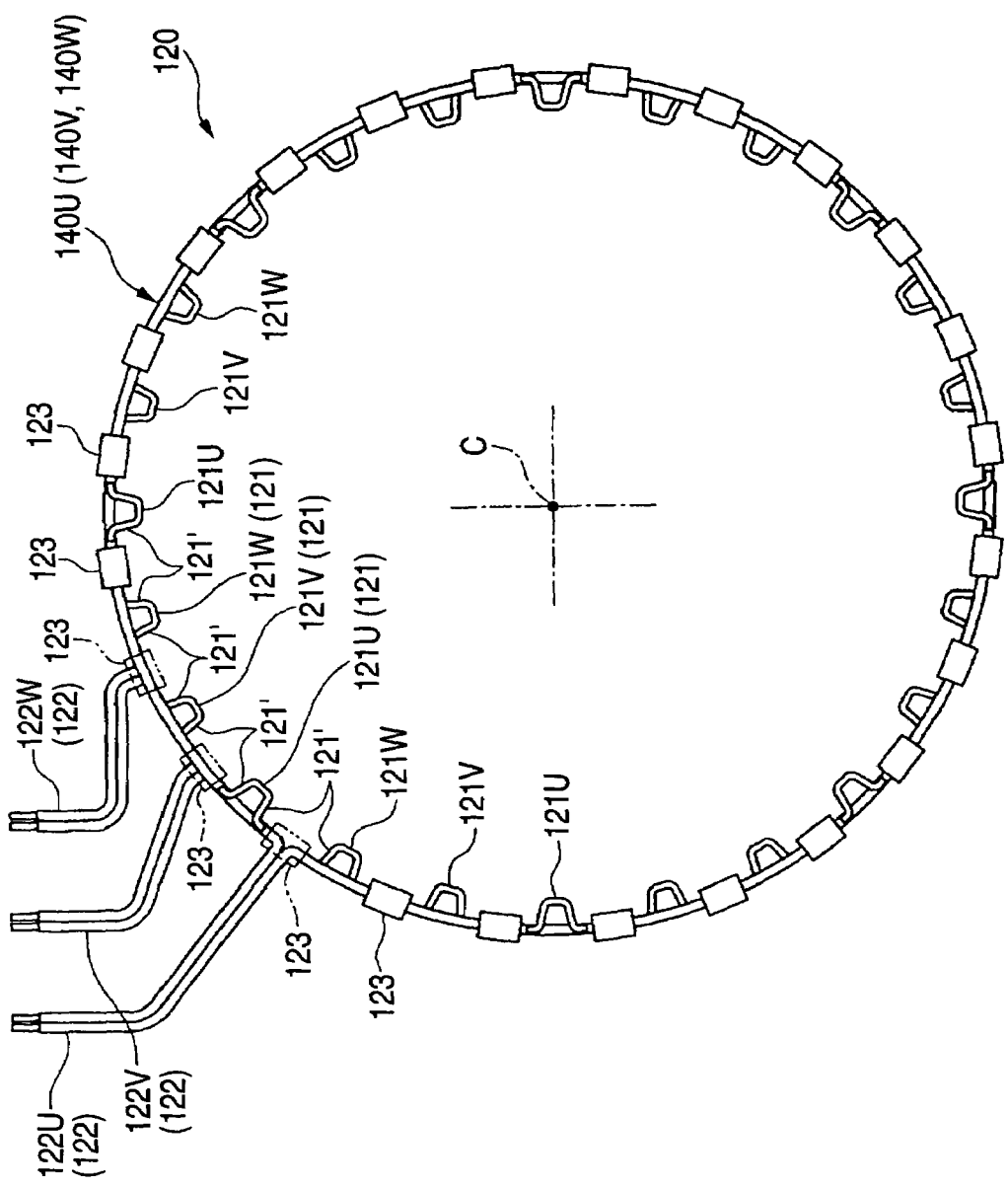
FIG. 11 is a front view showing the second embodiment of the invention.

A distributing part 120 shown in FIG. 11 is, similarly with the distributing part 20, a member having an annular shape and has a plurality (24 in this embodiment) of terminal portions 121 which protrude radially inwardly and feeding terminal portions 122 of three phases which are formed so as to extend radially outwardly.

Each terminal portion 121 is formed into a U-like shape having a pair of side portions 121' which extend along the radial direction. Then, these terminal portions 121 are assigned to terminal portions 121U which correspond to the U phase, terminal portions 121V which correspond to the V phase and terminal portions 121W which correspond to the W phase and are disposed at equal intervals in the circumferential direction while being continuously arranged in the clockwise direction, as viewed in FIG. 11, in the order of U, V and W phases. In addition, the feeding terminal portions 122 are assigned to a feeding terminal portion 122U which corresponds to the U phase, a feeding terminal portion 122V which corresponds to the V phase, and a feeding terminal portion 122W which corresponds to the W phase and are led to the terminal holder 6a along predetermined paths.

Then, the distributing part 120 is fixed integrally by making the ring-like lead frames 140U, 140V, 140W which correspond to the respective phases get together side by side in the direction of the axis C and partially connecting the frames together with a molding resin (fixing member) 123.

Figure 12:
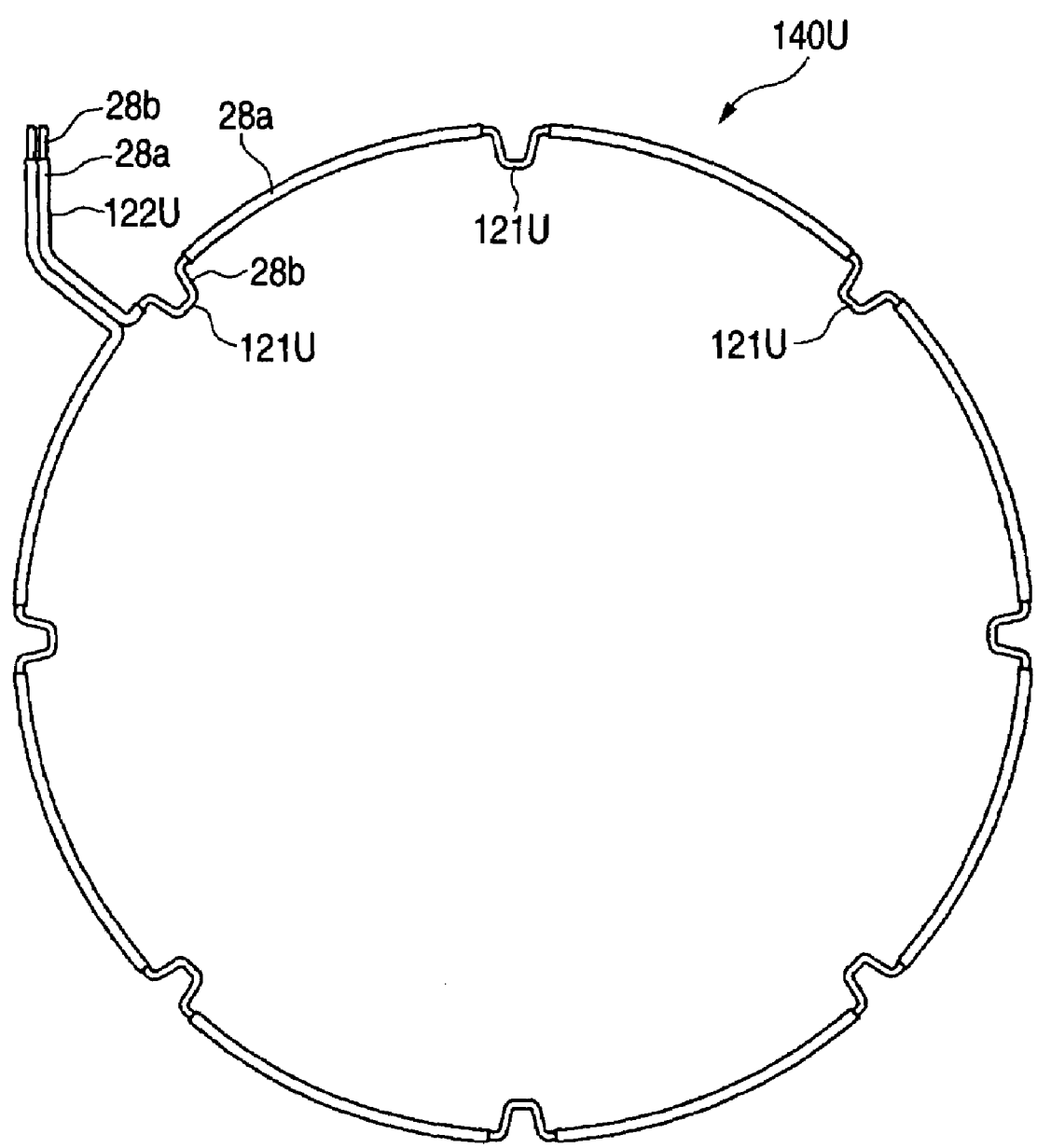
FIG. 12 is front view of a lead frame.

As with the frame part 28, the lead frame 140U is such that an insulated electric wire comprising a solid wire conductor 28b which is covered with an insulating material 28a is formed into an annular shape, and as shown in FIG. 12, the lead frame 140U is bent radially inwardly at a plurality (eight in this embodiment) of locations so as to form the terminal portions 121U. In addition, a joint of the insulated electric wires is provided in the vicinity of one of the terminal portions 121, and the feeding terminal portion 122U is formed in such a manner as to extend radially outwardly from this joint.

Note that while the lead frames 140V, 140W have a similar construction to that of the lead frame 140U, they are different from the lead frame 140U in that the lead frame 140V has the terminal portions 121V and the feeding terminal portion 122V, and the lead frame 140W has the terminal portions 122W and the feeding terminal portion 122W (neither of the lead frames 140V, 140W are shown).

A stripping process is applied to the respective terminal portions 121U, 121V, 121W so as to strip off the insulating material 28a at the locations where the bent portions are formed, where by the solid wire conductor 28b is exposed there at. Note that the insulating material 28 is also stripped off distal ends of the respective feeding terminal portions 122U, 122V, 122W, whereby the solid wire conductor 28b is also exposed thereat.

Then, the lead frames 140U, 140V, 140W which corresponds to the respective phases are made to get together side by side in the direction of axis C in such a manner that the positions of the respective terminal portions 121U, 121V, 121W are shifted to be changed in the circumferential direction. In this state, a molding process is applied so as to provide the molding resin 123 between the respective terminal portions 121, whereby the lead frames 140U, 140V, 140W which correspond to the respective phases are partially connected together so that the distributing part 120 is fixed integrally.

Figure 13:
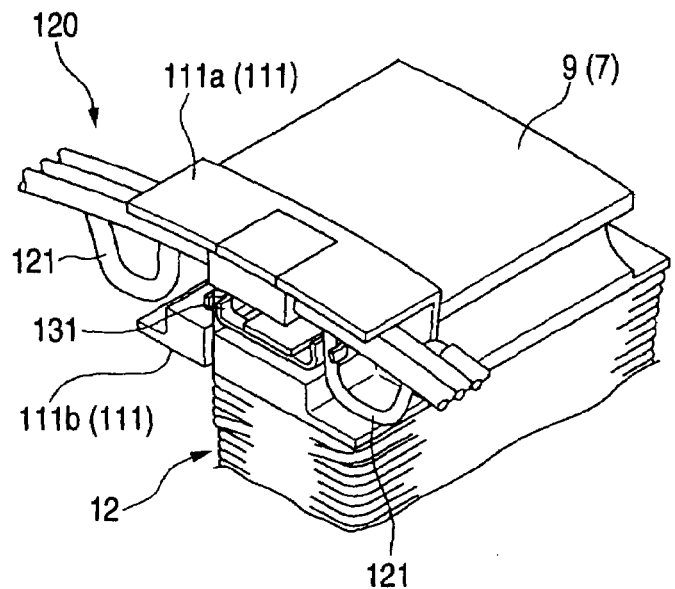
FIG. 13 is a perspective view of a guide portion.

When the distributing part 120 which is integrally formed as has been described heretofore is attached to the stator 7, the terminal portions 121 and the conducting wire ends 15 of the motor coils 8 which correspond to the respective phases are connected to each other. Here, as shown in FIG. 13, an insulating guide portion 111 on which the distributing part 120 is mounted is provided on the outer circumferential side of the motor coil 8. The guide portion 111 is provided on an outer circumferential side of the insulator 11 which is a location on the engine 2 side, and is formed so as to have a substantially U-shaped cross section which is made to open toward the engine 2 side. Assuming that a radially outward location of the guide portion 111 is referred to as an upper wall portion 111a and a radially inward location off the guide portion 111 is referred to as a lower wall portion 111b, the distributing part 120 is disposed in such a manner as to extend along a radially inward side of the upper wall portion 111a, and as with the connecting part 13, a connecting part 113 having two clamping portions is attached to a radially outward side of the lower wall portion 111b.

Figure 14A:
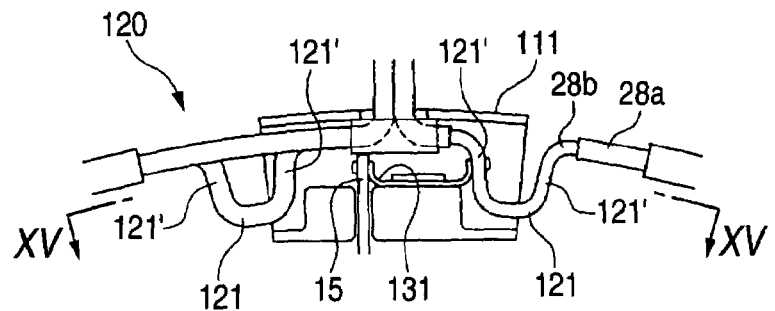
FIG. 14A is a front view of a connecting portion between a conducting wire end of a motor coil and a terminal portion.
Figure 14B:
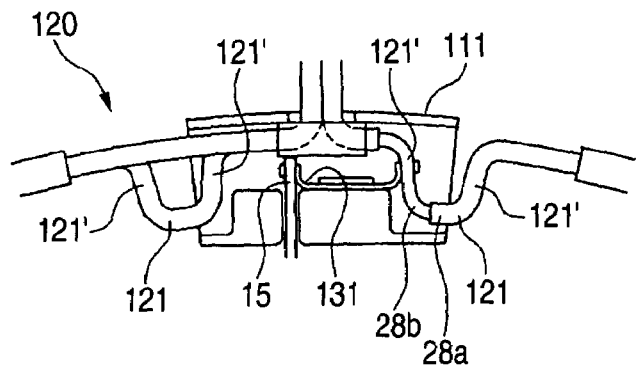
FIG. 14B is a front view showing a modified example of the connecting portion shown in FIG. 14A.

As shown in FIG. 14A, this connecting part 113 fixes the conducting wire end 15 of the motor coil 8 by one of the clamping portions and connects to the side portion 121' of the terminal portion 121 at the other clamping portion thereof, whereby the motor coil 8 is connected to the distributing part 120. Note that in FIG. 14A, the distance between the side portions 121' of the terminal portion 121 is extended by exposing the solid wire conductor 28b over the entirety of the U shapes so as to expanding a space for fusing work. In the event that the distance between the side portions 121' of the terminal portion 121 is wide enough, depending upon the performance of a stripping machine, as shown in FIG. 14B, the exposure range of the solid wire conductor 28b may be reduced to half the entire U shape.

As shown in FIG. 15, after the distributing part 120 has been connected to the motor coils 8, an insulating seal material S is filled from the winding end 15 of the motor coil 8 to the terminal portion 121 of the distributing part 120 within the cross section of the guide portion 111 in order to protect the connecting portion between the distributing part 120 and the motor coil 8. In this case, since the side portion 121' of the terminal portion 121 functions to stop a circumferential flow of the seal material S, there is no need to impart to the guide portion 111 an additional shape for stopping the flow of the seal material S and is also no need to use a jig for filling the seal material S.

According to the second embodiment that has been described heretofore, since the ring-like lead frames 140U, 140V, 140W can each be formed by bending the solid wire conductor, there is produced little waste material, thereby making it possible to largely increasing the yield of material.

In addition, since the respective lead frames 140U, 140V, 140W are formed integrally, the connection of the motor coils 8 can be ensured further when compared with the case where the lead frames are constructed to be divided into parts.

Furthermore, since the distributing part 120 is made up of the insulated electric wire comprising the solid wire conductor to which the insulating coating is applied, the lead frames 140U, 140V, 140W of the respective phases can be integrated with each other only by connecting them together with the molding resin 123 which is partially provided. Consequently, no molding process has to be applied to the entirety of the distributing part 120 with a view to electrically isolating the respective lead frames 140U, 140V, 140W and integrating them with each other. In the event that the lead frames 140U, 140V, 140W are caused to extend and/or contract due to a severe energizing cycle, a deformation of the distributing part 120 that would be so generated can be permitted.

In addition, since the shape for stopping the flow of the seal material S which is filled at the connecting portions can be formed by the terminal portion 121 of the distributing part 120, the shapes of peripheral parts and the filling operation of the seal material can both be attempted to be simplified.

Note that the invention is not limited to the first and second embodiments. For example, the connection of the frame parts 28 and the connection of the frame parts 28 and the conducting wire ends 15 of the motor coils 8 may be implemented through clamping or contact bonding instead of through soldering. Furthermore, such connections may be implemented through fusion welding. In this case, by performing fusing directly on the insulating coating, the insulating coating is heated to be fused so that the solid wire conductor can be exposed without stripping off the insulating coating. Thus, the respective connections can be made stronger and the number of stripping operations that are applied to the terminal portions 121 can be reduced by using the fusion welding.

In addition, in the second embodiment, while the respective lead frames 140U, 140V, 140W are connected through molding process, the lead frames may be fixed with the fixing parts 26 used in the first embodiment.

Furthermore, in the first and second embodiments, while the middle point connection of the motor coils 8 is described as being implemented by direct connecting the conducting wire ends 14 on the inner circumferential side of the coils 8, a lead frame may be provided so as to be used exclusively for this purpose. In addition, while each lead frame is constituted by the single conducting wire which is coated with the insulating coating, the lead frame may be constituted by an insulated electric wire comprising a plurality of conducting wires which are bundled together so as to be covered with an insulating coating.

As has been described heretofore, according to the first aspect of the invention, since the ring-like lead frame can be formed integrally by bending the linear conductor, the loss of the material can be reduced largely, thereby making it possible to reduce the production costs. In addition, since the lead frame for connecting the motor coils of the same phase can be formed integrally without being divided into parts, the mechanical connection can be ensured, thereby making it possible to ensure further the electrical connection.

According to the second aspect of the invention, since the linear conductor can be exposed at the terminal portions by stripping off the insulating coating thereat with the remaining portions being allowed to continue to be covered with the insulating material, the lead frame which is insulated except for the terminal portions can easily be fabricated.

According to the third aspect of the invention, since the winding end of the motor coil and the terminal portions of the lead frames can be made to correspond in position to each other for connection, the connecting work can be performed easily and securely. In addition, since the side portions of the U shape can function to stop and dam up the flow of the seal material when filling the seal material at the connecting portions where the winding end of the motor coil is connected to the terminal portions for sealing the connecting portions, the shapes of peripheral parts and the filling operation of the seal material can be simplified.

According to the fourth aspect of the invention, since the lead frame can be formed by bending the linear conductor, the loss of the material can be reduced largely to thereby attempt to reduce the production costs. In addition, since the linear conductor can be exposed only at the terminal portions by stripping off the coating thereat with the remaining portions being allowed to continue to be covered with the insulating material, the lead frame which is insulated except for the terminal portions can easily be fabricated. Furthermore, since the winding end of the motor coil can be held between the bent portions of the frame parts for temporary fixation, the operability at the time of connecting the motor coils can be enhanced.

According to the fifth and ninth aspects of the invention, since the winding end of the motor coil and the bent portions of the frame parts can be made to correspond in position to each other for connection and the connection of the respective frame parts and the connection of the bent portions of the frame parts with the winding ends of the motor coils can be implemented simultaneously, the connecting work can be performed easily and securely, and the number of man hours required for the work can reasonably reduced. In addition, since the bent portions of the lead frame and the winding ends of the motor coils can be directly connected to each other, there is no need to provide a connecting part therebetween, thereby making it possible to reduce the number of components involved.

According to the sixth aspect of the invention, since the connection of the respective frame parts and the connection of the bent portions of the frame parts with the winding ends of the motor coils can be implemented simultaneously through soldering, the number of man hours required for the work can be reasonably reduced.

According to the seventh aspect of the invention, since the connection of the respective frame parts and the connection of the bent portions of the frame parts with the winding ends of the motor coils can be implemented simultaneously through fusion welding, the number of man hours required for the work can be reasonably reduced. In addition, since the linear conductors can be welded together by heating them directly from the insulating material so as to fuse the insulating material rather than stripping them off, the stripping processes that would otherwise have to be applied to the bent portions can be eliminated, and the connection of the lead frames can be ensured.

According to the eighth aspect of the invention, since the lead frames which corresponding to the plurality of phases can be handled collectively, the connecting work with the respective motor coils can be performed efficiently and smoothly. In addition, since the extension and/or contraction of the respective lead frames can be permitted by fixing the lead frames partially, in the event that the respective lead frames are caused to extend and/or contract due to heat, the deformation of the distributing part and the damage to the insulating properties thereof can be prevented.

What is claimed is:

1. A lead frame for connecting motor coils of the same phase of an electric motor, the lead frame comprising:
    a linear conductor including at least a single conducting wire, and having terminal portions formed by bending for connection with winding ends of the motor coils,
    wherein said lead frame is integrally formed by the linear conductor,
    wherein the terminal portions are formed to be projections which protrude radially inward from an annular member, and
    wherein each terminal portion is equally spaced from a neighboring terminal portion.

2. A lead frame as set forth in claim 1, wherein the linear conductor is covered with an insulating material.

3. A lead frame as set forth in claim 2, wherein the terminal portions are exposed from the insulating material.

4. A lead frame as set forth in claim 1, wherein the lead frame is formed annularly along a direction in which the motor coils are arranged, and wherein the terminal portions are formed into a U-shape in such a manner as to protrude radially inwardly and are provided to correspond in position to the motor coils, respectively.

5. A lead frame as set forth in claim 2, wherein the lead frame is formed annularly along a direction in which the motor coils are arranged, and wherein the terminal portions are formed into a U-shape in such a manner as to protrude radially inwardly and are provided to correspond in position to the motor coils, respectively.

6. A lead frame for connecting motor coils of the same phase of an electric motor, the lead frame comprising:
    a plurality of annular frame parts, each annular frame part including a linear conductor and having bent portions at end portions thereof,
    wherein the adjacent bent portions of each annular frame part extend radially inward, are electrically connected to each other, and form a single body wherein a winding end of the motor coil is held therebetween, and
    wherein the adjacent bent portions of the frame parts are connected to each other through soldering.

7. A lead frame for connecting motor coils of the same phase of an electric motor, the lead frame comprising:
    a plurality of annular frame parts, each annular frame part including a linear conductor and having bent portions at end portions thereof,
    wherein the adjacent bent portions of each annular frame part extend radially inward, are electrically connected to each other, and form a single body wherein a winding end of the motor coil is held therebetween, and
    wherein the adjacent bent portions of the frame parts are connected to each other through fusion welding.

8. A distributing part of an electric motor, the distributing part comprising:
    the lead frames as set forth in claim 1 provided for at least a U-phase, a V-phase, and a W-phase, respectively, the plurality of lead frames being fixed together with a fixing member partially so as to be integrated into a single body.

9. A lead frame for connecting motor coils of the same phase of an electric motor, the lead frame comprising:
    a plurality of frame parts, each including a linear conductor and having bent portions at end portions thereof,
    wherein the adjacent bent portions of the frame parts are connected to each other by either one of soldering and fusion welding to form single body in such a manner that a winding end of the motor coil can be held therebetween.

10. A lead frame as set forth in claim 9, wherein the linear conductor is covered with an insulating material.

11. A lead frame as set forth in claim 10, wherein the bent portions are exposed from the insulating material.

12. A lead frame as set forth in claim 9, wherein the lead frame is formed annularly along a direction in which the motor coils are arranged, and wherein the bent portions extend radially inwardly and are provided to correspond in position to the motor coils, respectively.

* * * * *